United States Patent
Rose et al.

(10) Patent No.: US 9,174,647 B2
(45) Date of Patent: Nov. 3, 2015

(54) VEHICLE DRIVER-MODEL CONTROLLER WITH ENERGY ECONOMY RATING ADJUSTMENTS

(71) Applicant: FORD GLOBAL TECHNOLOGIES, LLC, Dearborn, MI (US)

(72) Inventors: Lawrence M. Rose, Berkley, MI (US); Benjamin L. Pence, Dearborn, MI (US); Poyu Tsou, Canton, MI (US); Judy H. Che, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 116 days.

(21) Appl. No.: 13/925,948

(22) Filed: Jun. 25, 2013

(65) Prior Publication Data
US 2014/0379246 A1 Dec. 25, 2014

(51) Int. Cl.
*B60W 40/09* (2012.01)
*B60W 50/00* (2006.01)

(52) U.S. Cl.
CPC .............. *B60W 50/00* (2013.01); *B60W 40/09* (2013.01); *B60W 2050/0063* (2013.01); *B60W 2540/30* (2013.01)

(58) Field of Classification Search
CPC ..... B60W 10/04; B60W 30/18; B60W 3/182; B60W 40/00; B60W 40/12; B60W 40/105–40/109; B60W 50/00; B60W 2050/0012; B60W 2050/0026; B60W 2050/0062–2050/0063; B60W 2050/0089; B60W 50/0097; B60R 16/0236; G05D 1/0005; G01F 9/00

USPC ............................. 701/93–94, 110, 115, 123
See application file for complete search history.

(56) References Cited

U.S. PATENT DOCUMENTS

| | | | |
|---|---|---|---|
| 8,374,781 B2* | 2/2013 | Hartman | 701/439 |
| 2010/0030458 A1* | 2/2010 | Coughlin | 701/123 |
| 2011/0160992 A1* | 6/2011 | Crombez | 701/123 |
| 2012/0173075 A1* | 7/2012 | Mays | 701/34.2 |
| 2012/0179319 A1* | 7/2012 | Gilman et al. | 701/22 |
| 2012/0221234 A1* | 8/2012 | Sujan et al. | 701/123 |
| 2012/0245837 A1* | 9/2012 | Lee et al. | 701/123 |
| 2013/0035837 A1* | 2/2013 | Johansson et al. | 701/98 |
| 2013/0096748 A1* | 4/2013 | Hussain et al. | 701/22 |
| 2013/0131919 A1* | 5/2013 | Pan | 701/36 |
| 2013/0166181 A1* | 6/2013 | Pan | 701/110 |
| 2013/0261942 A1* | 10/2013 | McQuade et al. | 701/115 |
| 2013/0302756 A1* | 11/2013 | Takeuchi et al. | 434/64 |
| 2014/0074386 A1* | 3/2014 | McGee et al. | 701/113 |
| 2014/0081563 A1* | 3/2014 | Wang et al. | 701/113 |
| 2014/0136454 A1* | 5/2014 | Hirade | 706/12 |

(Continued)

OTHER PUBLICATIONS

Calculate Velocity.pdf (Calculate Velocity as a function of Acceleration and Time, Apr. 15th 2010, http://www.calculatorsoup.com/calculators/physics/velocity_a_t.php, as archived on wayback machine at https://web.archive.org/web/20100415154826/http://www.calculatorsoup.com/calculators/physics/velocity_a_t.php, pp. 1-3).*

(Continued)

*Primary Examiner* — Bao Long T Nguyen
(74) *Attorney, Agent, or Firm* — James Dottavio; MacMillan, Sobanski & Todd, LLC

(57) ABSTRACT

A controller with energy economy rating (EER) calibration logic is configured to adjust a look-ahead time and feed-forward mapping window for vehicle controls according to EER.

11 Claims, 4 Drawing Sheets

(56) References Cited

U.S. PATENT DOCUMENTS

2014/0188379 A1* 7/2014 Gostoli et al. .............. 701/123
2014/0244129 A1* 8/2014 Filev et al. .............. 701/93

OTHER PUBLICATIONS

SAE J2951.pdf (Surface Vehicle Recommended Practice J2951, Jan. 2014, SAE International, p. 12).*

Idvc-20130514.pdf (EPA/Industry Light-Duty Vehicle Compliance Meeting, May 14, 2013, U.S. Environmental Protection Agency, p. 62).*

SAE Surface Vehicle Recommended Practice, Drive Quality Evaluation for Chassis Dynamometer Testing, SAE J2951 Nov. 2011.

Environmental Protection Agency—Light-Duty Automotive Industry Compliance Meeting, Jun. 17, 2010.

* cited by examiner

VEHICLE DRIVER-MODEL CONTROLLER WITH ENERGY ECONOMY RATING ADJUSTMENTS

BACKGROUND OF INVENTION

The present disclosure relates to vehicle controllers that operate the vehicle according to historical vehicle performance data.

Energy Economy Rating (EER) is an energy-based metric used in fuel economy testing to quantify fuel economy variability due to drive quality. The EER gives a quantitative measure of drive quality that includes the effects of both the energy expended and the distance driven on the fuel economy results. Some standardized fuel economy tests, such as those defined by the Environmental Protection Agency (EPA), require that the EER of the test vehicle be within specified limits. If the EER value violates these limits, the fuel economy results are deemed invalid. Numerical vehicle models simulate various vehicle physics including vehicle dynamics and fuel usage. These models can predict the fuel economy of the vehicles. A numerical cycle driver is the part of the numerical vehicle model that simulates human inputs including: braking, accelerating, shifting gears, engaging the clutch, and steering. In simulations used to predict fuel economy, the numerical cycle driver's goal is to calculate values of acceleration, braking, and possibly gear shifting events to get the velocity of the numerical vehicle model to match a target velocity trace (as defined by a drive cycle). For fuel economy predictions to reflect those obtained by human drivers, the values of acceleration, braking, and/or shifting calculated by the numerical cycle driver should be representative of human drivers. The numerical cycle driver applies some type of control strategy to cause the numerical vehicle model's velocity to match the target velocity (drive cycle). One type of control strategy is feedback control, such as Proportional Integrated Differential (PID) control. Numerical cycle drivers based solely on feedback control rely on the instantaneous difference between a target velocity and a simulated vehicle velocity from the model to calculate acceleration, braking, and shifting events. Such driver models do not have the ability to "look ahead"; therefore, numerical cycle drivers based solely on feedback control do not accurately represent a human driver's ability to anticipate future changes in vehicle velocity. As a result, the cycle driver overcompensates, applying too much acceleration and too much braking in order to achieve the target velocity. This overcompensation can affect the EER and/or cause the simulated fuel economy results to poorly reflect those achieved by human drivers.

It is desirable to allow the numerical cycle driver to anticipate and incorporate future values of target velocity. In some cases it is also desirable to tune the numerical cycle driver to be able to achieve a specified EER value while simultaneously achieving fuel economy ratings similar to those obtainable by human drivers. Therefore, it would be beneficial to take a desired EER value as an input when designing numerical cycle driver controllers used to simulate fuel economy tests.

SUMMARY OF INVENTION

The present disclosure addresses one or more of the above-mentioned issues. Other features and/or advantages will become apparent from the description which follows.

One advantage of the present disclosure is that by encompassing the discussed controller features, the numerical driver model is able to control the vehicle system model to achieve prescribed EER values and to better represent human drivers, e.g., prescribed vehicle speed traces defined by various standards setting entities.

One exemplary embodiment of the present disclosure relates to a controller with energy economy rating (EER) calibration logic configured to adjust a look-ahead feed-forward mapping window for vehicle controls according to EER.

Another exemplary embodiment of the present disclosure relates to a computer-implemented method of operating a vehicle, including: storing data for a plurality of vehicle dynamic information (VDI) over time; defining a first relationship between a first VDI and a second VDI based on stored data received over a first look-ahead time window; defining a second relationship between the first VDI and second VDI based on stored data received over a second look-ahead time window; and controlling the vehicle based on a target energy economy rating (EER).

Another exemplary embodiment of the present disclosure relates to a computer-implemented method of operating a vehicle, including: storing vehicle dynamic information (VDI) during vehicle operation; defining a relationship between VDI over a look-ahead time window; and controlling the vehicle according to the defined relationship. When a target energy economy rating (EER) is less than a predetermined value, the method controls the vehicle over a larger look-ahead time window than when the target energy economy rating (EER) is less than the predetermined value.

Another exemplary embodiment of the present disclosure relates to a system for controlling a vehicle, having: vehicle dynamic sensors configured to collect vehicle dynamic information (VDI); memory configured to store the plurality of VDI; a controller configured to control a first vehicle subsystem associated with a first VDI based on relationship data between the first VDI and a second VDI over a flexible time-mapping window; and an energy economy rating (or EER) calibrator, configured to alter the time-mapping window in which control over the first vehicle subsystem is based.

The invention will be explained in greater detail below by way of example with reference to the figures. The same reference numbers are used in the figures for identical or essentially identical elements. The above features and advantages of the present teachings are readily apparent from the following detailed description of the best modes for carrying out the invention when taken in connection with the accompanying drawings. In the figures:

DETAILED DESCRIPTION

Figure 1:
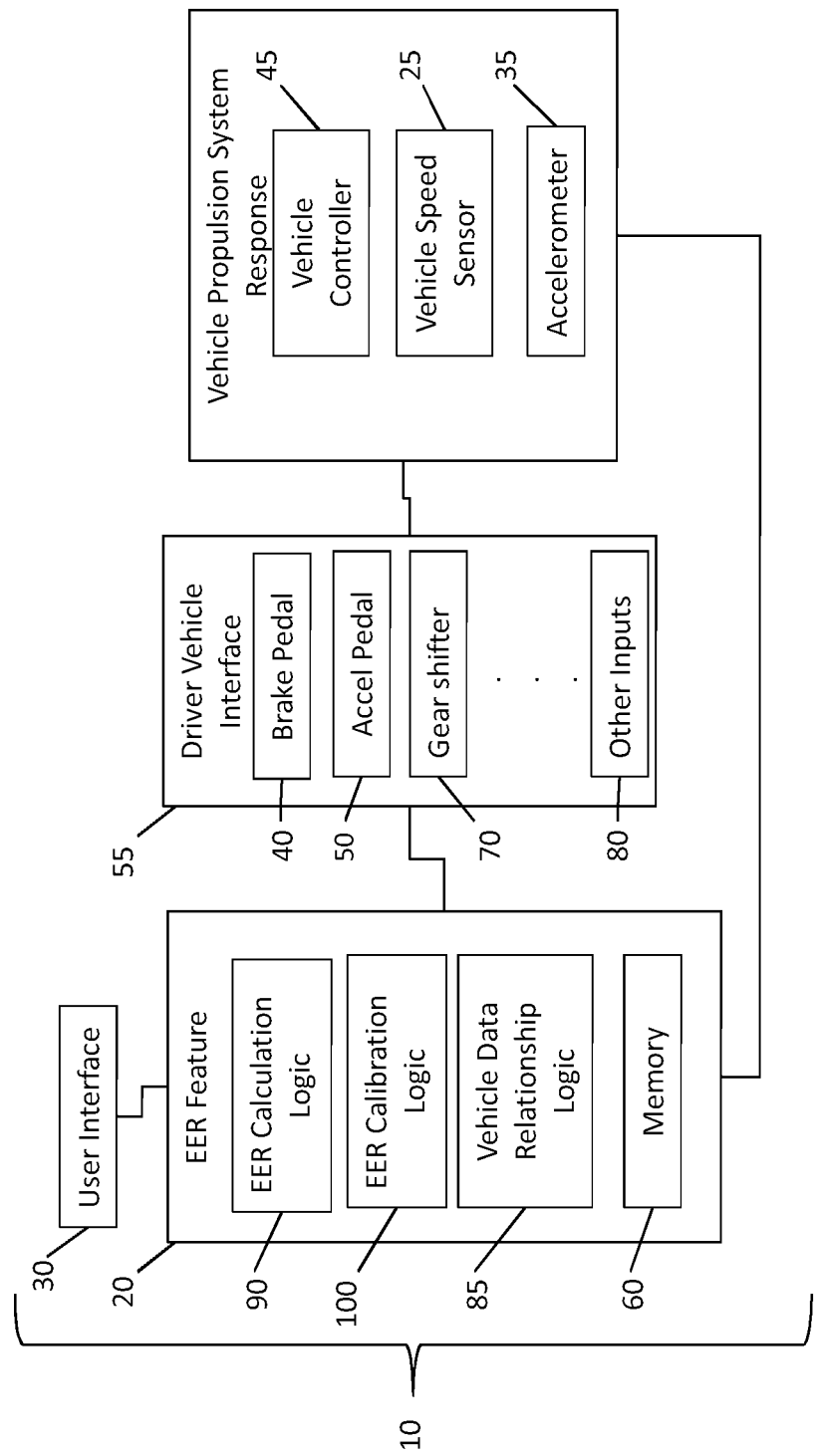
FIG. 1 is a schematic depiction of a system for controlling a vehicle according to an exemplary embodiment of the present disclosure.

Referring to the drawings, wherein like characters represent examples of the same or corresponding parts throughout the several views, there is shown an exemplary system for operating a vehicle and a control method for the same. The system includes a vehicle controller, such as a PID (or proportional integrated differential) feedback controller configured to adjust one vehicle performance characteristic based on other vehicle performance characteristics (or user inputs) until a desired performance is obtained. The illustrated system and method take into account fuel economy. Specifically, after a target EER is received by the system controller, information is used to modify drive style, which affects fuel economy. A feed-forward mapping window and look-ahead strategy is adjustable to meet prescribed EER targets.

Referring now to FIG. 1, there is shown therein a system 10, for controlling a vehicle using a feedback/feed-forward/look-ahead controller according to an exemplary embodiment of the present disclosure. An EER feature 20 is programmed into a controller that is configured to provide feed-forward commands to various vehicle systems based on historical vehicle performance data. A number of vehicle response signals, e.g., related to vehicle speed or acceleration, are sent to the EER feature and provide input thereto. A vehicle propulsion system response is measured via a vehicle speed sensor 25, acceleration sensor 35 which are in communication with a vehicle controller 45. System response features are linked to the EER feature 20. In the illustrated system, EER feature 20 is also linked to a user interface 30. User interface 30 is used by a driver or service technician to select a vehicle driving style or "quality" as in this case is defined by a target EER value for the vehicle. As discussed herein below, EER can be greater than or less than zero. For this system, EER designations greater than or equal to zero are associated with an aggressive style; and system EER designations less than zero are associated with a more smooth driving style.

The system 10 of FIG. 1 contains a driver vehicle interface 55. The driver vehicle interface 55 includes a brake pedal sensor 40 and an accelerator pedal sensor 50. A pedal ratio is used to normalize the accelerator and brake pedal inputs from test data and combine them into a single signal, ranging from −1 for full brake to +1 for full accelerator.

EER feature 20, as shown in FIG. 1, includes memory 60 to store historical data related to each type of vehicle response. Memory 60 can be any type of media including, for example random-access memory (or RAM) or dynamic RAM (or DRAM). The EER feature 20 shown also includes vehicle data relationship logic 85. Logic 85 is configured to represent the relationships or interconnectedness of multiple vehicle dynamic information (VDI) or vehicle performance characteristics with respect to each other. For example, as illustrated in the exemplary plots of FIG. 2, a relationship between acceleration, vehicle speed and pedal ratio for a vehicle is shown. Relationship logic 85 can express the relationship between multiple variables in graphical form (e.g., 300 and 310, as shown in FIG. 2) or in other forms such as, for example, in data charts or look-up tables, or formulas.

Referring again to FIG. 1, driver interface also includes other inputs that are linked to the EER feature including a gear shifter 70 configured to determine transmission gear selection. Other inputs (as represented by 80) can also be used. The EER feature 20 further includes EER calculation logic 90 and EER calibration logic 100 as discussed in more detail herein below.

Figure 2:
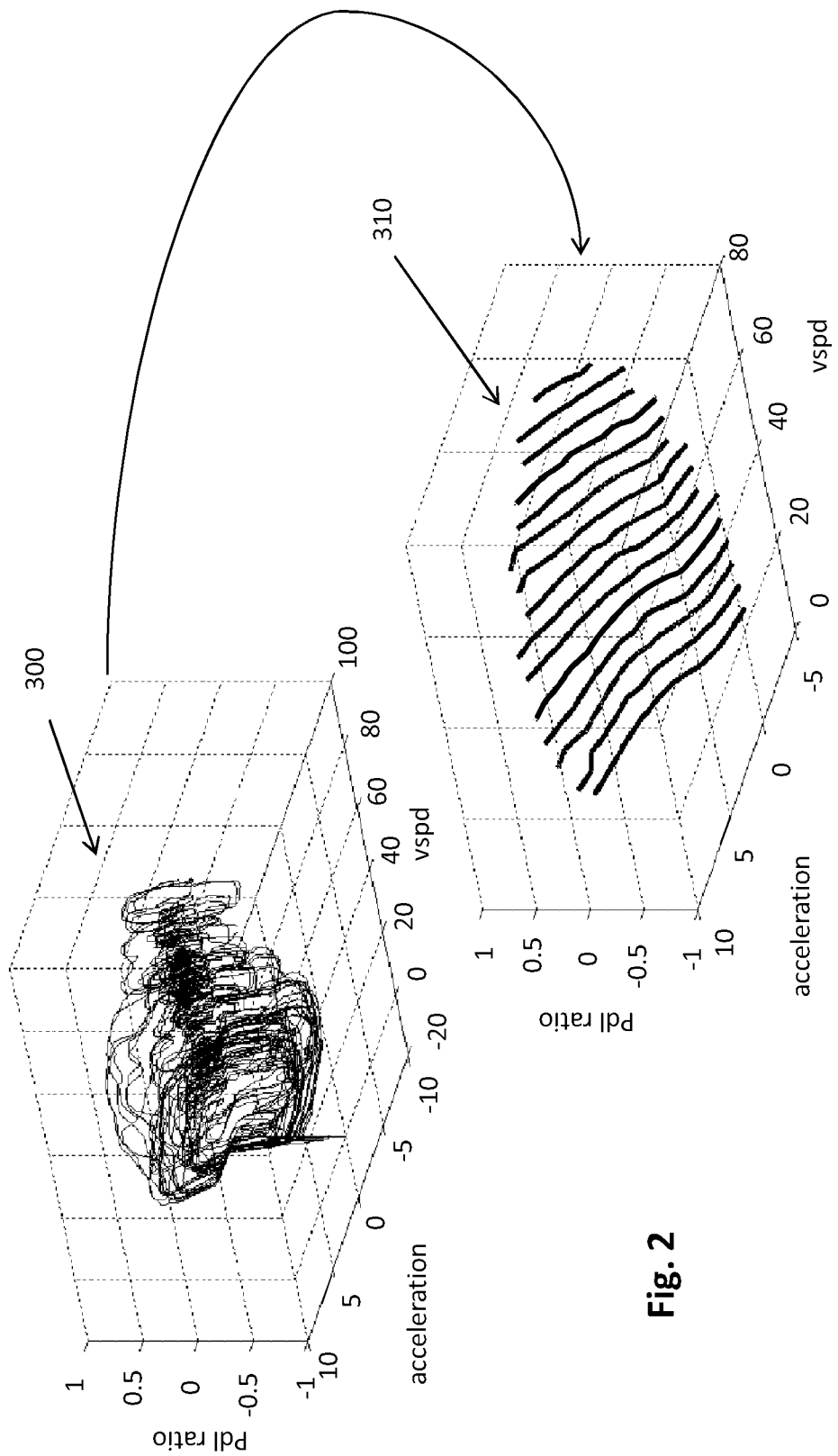
FIG. 2 shows relationship plots for several vehicle performance characteristics that can be used with the system of FIG. 1.

The vehicle data response relationships 300, 310 for the illustrated exemplary embodiment of FIG. 2 include feed-forward plots created from vehicle test data. In the embodiment of FIG. 2, one of the axes represents vehicle speed, another axis represents acceleration and a third axis represents pedal ratio, as shown. The feed-forward map is generated from a vehicle acceleration response to accelerator and brake pedal inputs obtained from a systematic sweep of desired vehicle acceleration. The feedback controller has reduced gains that are driven by an error between target vehicle velocity and actual vehicle velocity. Given a known target velocity trace as a function of time, acceleration can be computed over a given time-mapping window based on historical vehicle data. The estimated acceleration and target velocity are inputs to the feed-forward acceleration plot 300 shown in FIG. 2. Since the feed-forward map shown is based on total vehicle acceleration, it is also based on wheel torque. Therefore, there is no limitation for usage regardless of vehicle powertrain hardware, for example, for alternatives such as gasoline versus diesel engines or Hybrid Electric Vehicles (HEVs) versus Battery Electric Vehicles (BEVs). The present disclosure is applicable to any propulsion technology.

In this embodiment, the feed-forward plot 300 is taken from feature memory 60 (as shown in FIG. 1) following a designed trace of specified vehicle performance characteristics, such as constant accelerations. Using these results a multi-line or simple surface plot 310, e.g., as shown in FIG. 2, was constructed.

Two plots 300, 310 are shown in FIG. 2. A continuous line graph or trace 300 is shown. Actual measured data for each vehicle characteristic is plotted. From there a representative plot, 310 as shown, is estimated for different speed intervals. These lines are shown as the data from 300 are curve-fitted to form the response surface as shown in 310.

The EER feature 20, as shown in FIG. 1, outputs accelerator and brake pedal commands that are adjusted automatically according to a desired EER target by EER calibration logic 100. The EER response can be achieved by varying a time window that utilizes future target velocity information to calculate the current target acceleration. Longer time windows use more "future" information. Shorter time windows use less future information.

The aforementioned EER feature 20, of FIG. 1, also employs an EER calibration (or qualifying) logic 100. For desired EER values less than zero, the time window for calculating the target acceleration is increased, thus including more future target velocity information. This method results in a relatively smoother driving style, anticipating certain vehicle events. For a desired EER value greater than zero: a look-ahead window is kept relatively small, thus including less future information. This has the effect of moving the vehicle more aggressively. This represents a human response characteristic of someone who is following the car in front of them without sufficient distance for braking.

The algorithms as discussed herein can be stored within a circuit or system having a system with a processor. The algorithms can be programmed using any programming language.

Figure 3:
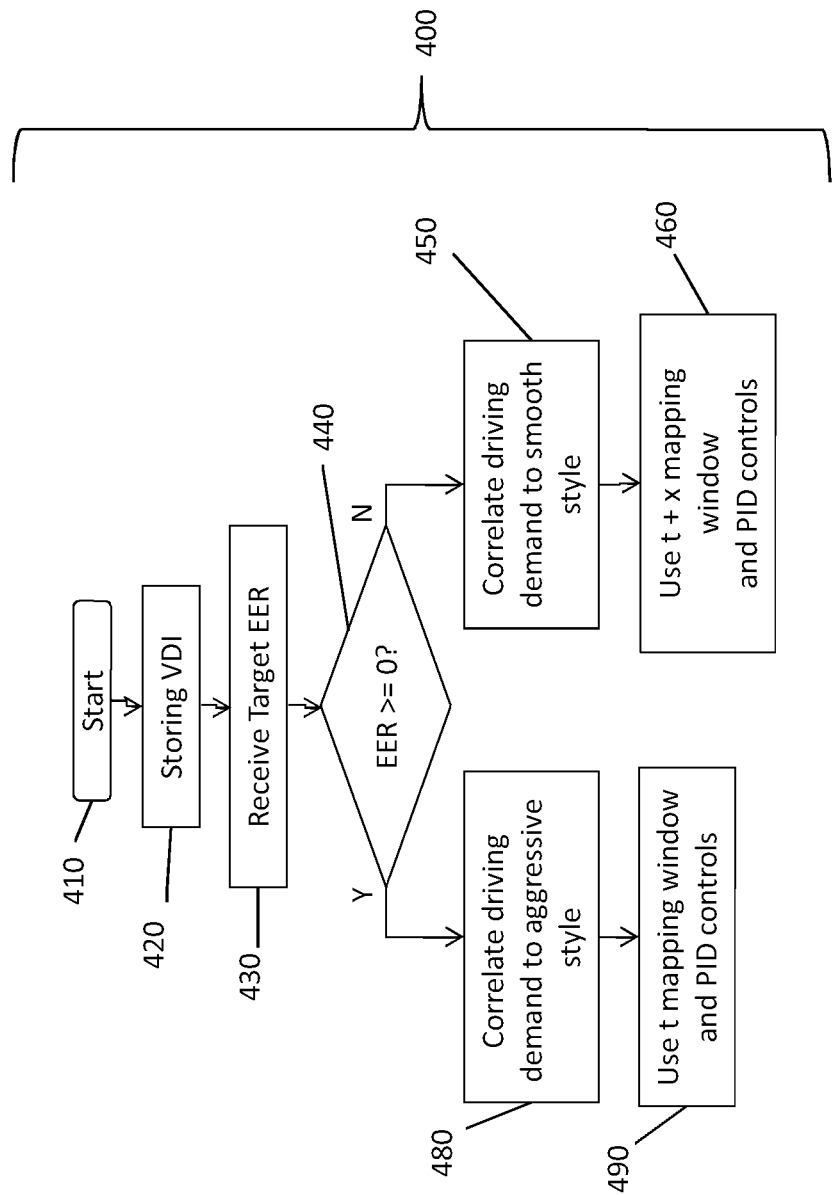
FIG. 3 illustrates a flowchart for a method of operating a vehicle according to an exemplary embodiment of the present disclosure.

Turning now to FIG. 3, there is shown therein a method 400 of controlling a vehicle according to an embodiment of the present disclosure. The method 400 can be executed by a controller, e.g., EER feature 20, as discussed with respect to FIGS. 1 and 2. In FIG. 3, the method 400 starts at 410. Vehicle drive information is stored into memory over time. A storage device, e.g., 60, shown in FIG. 1 can be used. The EER feature 20 is configured to receive a target EER at 430. The target EER can be inputted by a driver, service technician or other source. When utilizing the EER calculation method discussed below, EER is expressed in terms of a percentage. This program segregates EER ratings greater than or equal to zero from EER ratings less than zero at 440. Time windows are sized for look-ahead, feed-forward commands that are determined based on the target EER value.

With respect to the method of FIG. 3, where the EER rating is greater than or equal to zero, the rating corresponds to an "aggressive" style of driving—intended to allow more overshoot or excitations of the vehicle speed relative to a target speed following path 480 as shown in FIG. 3. Where an EER is greater than or equal to zero a mapping window for the controller is given a shorter time span (or less information) for feed-forward commands. The time window is defined as t, for time at step 490.

Where the EER rating is less than zero, as shown in FIG. 3, the rating is correlated to a "smoother" style of driving—intended to have less overshoot or needless excitations in vehicle speed following path 450. Where an EER is less than or equal to zero a mapping window for the controller is given a longer time span (or more information) for feed-forward commands. The time window is defined as t+x at step 460. Variable x represents a numerical value that could be associated with any positive number.

Figure 4:
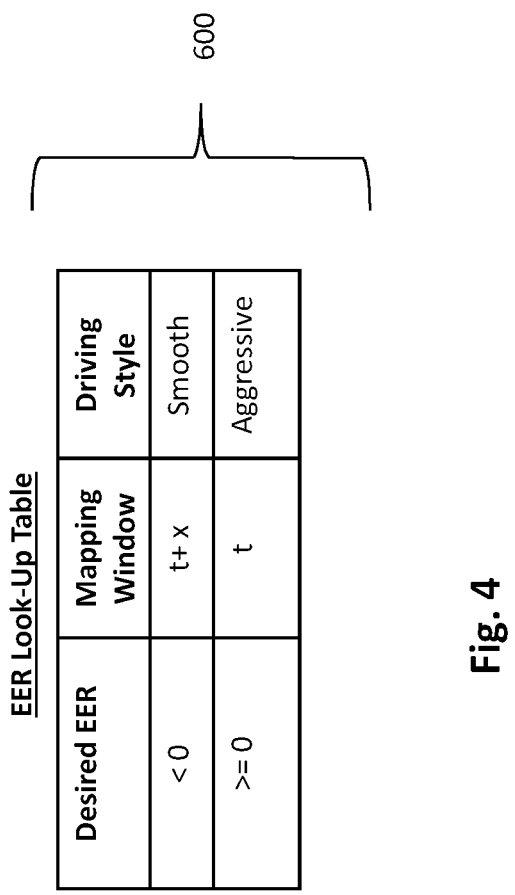
FIG. 4 is an EER look-up table for time windows over which vehicle performance characteristics are defined.

Now turning to FIG. 4, there is shown therein EER correlation logic 600 for use, e.g., with the method of FIG. 3. Correlation logic 600 takes the form of a look-up table. Desired EER ratings are compared to zero. For EER targets greater than or equal to zero, the time-mapping window is equal to t. As discussed above, t is associated with less data or information than the t+x time-mapping window. A more aggressive style of driving is effectuated by the controller. For EER targets less than zero a larger time-mapping window is used for future target data. The time window is equal to t+x and is associated with a smooth style of driving.

The following known method of EER calculation can be employed by an EER feature using EER calculation logic, e.g., 90 as shown in FIG. 1. First a 0.5 sec moving average of a 10 Hz dynamometer roll speed ($V_{roll}$) was derived. The specific formula for dynamometer roll speed was as follows:

$$V_{roll\_avg\_1_i} = \frac{1}{5}\sum_{j=i-2}^{j=i+2} V_{roll_j}$$

Where $V_{roll\_avg\_1_i}$ was equal to zero j was less than 3 or j greater than N−2. Next, to derive a driven vehicle speed a 0.5 sec moving average of the dynamometer roll speed ($V_{roll\_avg\_1}$) was assigned to equal vehicle speed ($V_D$). Thus:

$$V_{D_i} = V_{roll\_avg\_2_i} = \frac{1}{5}\sum_{j=i-2}^{j=i+2} V_{roll\_avg\_1_j}$$

Just as with dynamometer roll speed, where $V_{Di}$ was equal to zero j was less than 3 or j greater than N−2. A target vehicle speed ($V_T$) was then calculated in the same manner, using a 10 Hz scheduled speed ($V_{sched}$) instead of the roll speed ($V_{roll}$). The target vehicle speed was calculated from the scheduled speed. In this embodiment, the scheduled speed is equal to the roll speed.

$$V_{T_i} = V_{sched\_avg\_2_i} = \frac{1}{5}\sum_{j=i-2}^{j=i+2} V_{sched\_avg\_1_j}$$

Thereafter, accelerations are calculated with finite computational methods. The difference between acceleration roll increments over time is calculable as follows.

$$a_{Di} = \frac{V_{D_{i+1}} - V_{D_{i-1}}}{t_{i+1} - t_{i-1}} = \frac{V_{D_{i+1}} - V_{D_{i-1}}}{2\Delta t}$$

The difference between acceleration targets increments over time is calculable as follows, where 2Δt=0.2 seconds.

$$a_{Ti} = \frac{V_{T_{i+1}} - V_{T_{i-1}}}{t_{i+1} - t_{i-1}} = \frac{V_{T_{i+1}} - V_{T_{i-1}}}{2\Delta t}$$

Distance increments are equal to dynamometer roll speed and target vehicle speed multiplied by a change in time, respectively.

$$d_{Di} = V_{Di} \cdot \Delta t$$

$$d_{Ti} = V_{Ti} \cdot \Delta t$$

The summation of the accumulated distances are computed as follows:

$$D_D = \sum_{i=1}^{N} d_{Di}$$

$$D_T = \sum_{i=1}^{N} d_{Ti}$$

Next, the road load forces ($F_{RL-Di}$ & $F_{RL-Ti}$) are based on dynamometer roll speed and target vehicle speed ($V_{Di}$ and $V_{Ti}$ respectively). The inertial forces ($F_{I-Di}$ & $F_{I-Ti}$) are based on the acceleration of the dynamometer roll, $a_{Di}$, and the acceleration of the vehicle speed, $a_{Ti}$.

Propulsive forces are calculated using the following formulas. The propulsive force for dynamometer roll speed is as follows:

$$F_{prop-Di} = \begin{cases} F_{RL-Di} + F_{I-Di} & \text{for } F_{RL-Di} + F_{I-Di} > 0 \\ 0 & \text{for } F_{RL-Di} + F_{I-Di} \leq 0 \end{cases}$$

The propulsive force for target vehicle speed is as follows:

$$F_{prop-Ti} = \begin{cases} F_{RL-Ti} + F_{I-Ti} & \text{for } F_{RL-Ti} + F_{I-Ti} > 0 \\ 0 & \text{for } F_{RL-Ti} + F_{I-Ti} \leq 0 \end{cases}$$

The propulsive work increments are derived from propulsive force calculations by multiplying them by summation of the accumulated distances over time.

$$W_{Di} = F_{prop-Di} \cdot d_{Di}$$

$$W_{Ti} = F_{prop-Ti} \cdot d_{Ti}$$

From there, cycle energy is equal to the summation of work over increments of time.

$$CE_D = \sum_{i=1}^{N} W_{Di}$$

$$CE_T = \sum_{i=1}^{N} W_{Ti}$$

An energy rating (ER) is defined as a percent difference between the total driven and target cycle energy. This is a unitless quantity expressed as follows:

$$ER = \frac{CE_D - CE_T}{CE_T} \cdot 100$$

A distance rating (DR) is defined as the percent difference between the total driven and scheduled distance. This is a unitless quantity expressed as follows:

$$DR = \frac{D_D - D_T}{D_T} \cdot 100$$

From there an energy economy rating (EER) gives a measure of drive quality that includes both the effects of energy rating and distance rating on fuel economy. This is also a unitless quantity. EER is reported out as a percentage:

$$EER = \left[1 - \frac{DR/100 + 1}{ER/100 + 1}\right] \cdot 100$$

In the illustrated embodiment of FIGS. 1-4, EER is equal to one minus a comparative ratio between distance rating and energy rating. Where the distance rating is more than the energy rating, EER is less than zero. In this model an EER of less than zero is associated with a smooth driving style. Where the distance rating is less than the energy rating, EER is greater than zero. With this model an EER of greater than or equal to zero is associated with an aggressive driving style. In other embodiments, other methods of calculating EER or drive quality can be used.

Those familiar with the art to which this invention relates will recognize various alternative designs and embodiments for practicing the invention within the scope of the appended claims.

What is claimed is:

1. A computer-implemented method of operating a vehicle, comprising:
   storing data for a plurality of vehicle dynamic information (VDI);
   defining a first relationship between first and second VDI's based on stored data for a first look-ahead time window;
   defining a second relationship between the first and second VDI's based on stored data for a second look-ahead time window; and
   automatically controlling the vehicle based on a target energy economy rating (EER).

2. The method of claim 1, wherein the first VDI is vehicle velocity and wherein the second VDI is vehicle acceleration.

3. The method of claim 1, further comprising: receiving the target EER from a vehicle user.

4. The method of claim 3, further comprising: calculating EER based on vehicle performance.

5. The method of claim 1, further comprising:
   correlating EER with a driving style;
   wherein an EER greater than or equal to zero is correlated with an aggressive driving style; and
   wherein an EER less than zero is correlated with a smooth driving style.

6. The method of claim 1, further comprising: calculating EER based on vehicle performance.

7. A computer-implemented method of operating a vehicle, comprising:
   storing data for multiple vehicle dynamic information (VDI) over time;
   defining a first relationship between first and second VDI's based on stored data for a first look-ahead time window;
   defining a second relationship between the first and second VDI's based on stored data for a second look-ahead time window, shorter than the first window;
   controlling the vehicle based on a target energy economy rating (EER).

8. The method of claim 7 wherein controlling the vehicle is automatically controlling the vehicle.

9. The method of claim 7, further comprising:
   correlating EER with a driving style;
   wherein an EER greater than or equal to zero is correlated with an aggressive driving style; and
   wherein an EER less than zero is correlated with a smooth driving style.

10. The method of claim 7, further comprising:
    calculating EER based on vehicle performance that is a measure of drive quality that includes an energy rating and a distance rating on fuel economy.

11. A computer-implemented method of operating a vehicle, comprising:
    storing data for multiple vehicle dynamic information (VDI) over time;
    defining a first relationship between first and second VDI's based on stored data for a first look-ahead time window;
    defining a second relationship between the first and second VDI's based on stored data for a second look-ahead time window, shorter than the first window;
    automatically controlling the vehicle based on a target energy economy rating (EER);
    correlating EER with a driving style, wherein an EER greater than or equal to zero is correlated with an aggressive driving style, and wherein an EER less than zero is correlated with a smooth driving style.

* * * * *